United States Patent
Dahlin et al.

(10) Patent No.: US 8,041,795 B2
(45) Date of Patent: Oct. 18, 2011

(54) METHOD AND ARRANGEMENT IN AN INTERNET PROTOCOL MULTIMEDIA SUBSYSTEM

(75) Inventors: Steinar Dahlin, Järfälla (SE); Clary Hallberg Dahlin, legal representative, Jarfalla (SE); Anders Ryde, Saltsjöbaden (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 12/514,755

(22) PCT Filed: Nov. 13, 2006

(86) PCT No.: PCT/EP2006/068391
§ 371 (c)(1),
(2), (4) Date: Feb. 25, 2010

(87) PCT Pub. No.: WO2008/058568
PCT Pub. Date: May 22, 2008

(65) Prior Publication Data
US 2010/0299420 A1   Nov. 25, 2010

(51) Int. Cl.
*G06F 15/177* (2006.01)
(52) U.S. Cl. ............................... 709/222; 709/220
(58) Field of Classification Search .............. 709/220, 709/222
See application file for complete search history.

(56) References Cited

U.S. PATENT DOCUMENTS

| | | | |
|---|---|---|---|
| 6,609,128 B1* | 8/2003 | Underwood | 707/610 |
| 7,028,101 B2* | 4/2006 | Costa-Requena et al. | 709/245 |
| 7,813,299 B2* | 10/2010 | Yumoto et al. | 370/254 |
| 2002/0196782 A1* | 12/2002 | Furukawa et al. | 370/352 |
| 2005/0120198 A1* | 6/2005 | Bajko et al. | 713/150 |
| 2005/0283832 A1* | 12/2005 | Pragada et al. | 726/12 |
| 2007/0124577 A1* | 5/2007 | Nielsen et al. | 713/151 |
| 2008/0070543 A1* | 3/2008 | Matuszewski et al. | 455/404.1 |

* cited by examiner

*Primary Examiner* — Phuoc Nguyen

(57) ABSTRACT

The present invention relates to a method and an arrangement for allowing private domains in the IMS, which makes it possible to use a SIP URI like ID@private-domain.TLD. This is achieved by providing an administration support and an interface to the IMS interconnect DNS and the DNS system of the operator network. The identity associated with private domain is established as a Private domain name based IMPU.

16 Claims, 10 Drawing Sheets

---

1001. Provide an interface to the IMS interconnect DNS and the DNS system

↓

1002. Provide an administration support

1002:

1003. Establish a private domain.

↓

1004. Connect an IMS user as a member of the private domain

↓

1005. Insert the requested private domain in the IMS interconnect DNS and in the DNS system.

↓

1006. Establish the identity associated with private domain as an alias to the IMS identity

The SIP INVITE (UE to P-CSCF)

INVITE sip:ID2@op5.com SIP/2.0 ←——— Request URI
Via: SIP/2.0/UDP [5555::aaa:bbb:ccc:ddd]:1357;comp=sigcomp;branch=z9hG4bKnashds7
Max-Forwards: 70
Route: <sip:pcscf1.visited1.net:7531;lr;comp=sigcomp>, <sip:scscf1.home1.net;lr>
P-Preferred-Identity: "John Doe" <sip:ID1@OP2.com>
P-Access-Network-Info: 3GPP-UTRAN-TDD; utran-cell-id-3gpp=234151D0FCE11
Privacy: none
From: <sip:ID1@op2.com>;tag=171828 ←——— From
To: <sip:ID2@op5.com> ←——— To
Call-ID: cb03a0s09a2sdfglkj490333
Cseq: 127 INVITE
Require: precondition, sec-agree
Proxy-Require: sec-agree
Supported: 100rel
Security-Verify: ipsec-3gpp; q=0.1; alg=hmac-sha-1-96; spi-c=98765432; spi-s=87654321;
     port-c=8642; port-s=7531
Contact: <sip:[5555::aaa:bbb:ccc:ddd]:1357;comp=sigcomp>
Allow: INVITE, ACK, CANCEL, BYE, PRACK, UPDATE, REFER, MESSAGE
Content-Type: application/sdp
Content-Length: (...)

Fig. 3

METHOD AND ARRANGEMENT IN AN INTERNET PROTOCOL MULTIMEDIA SUBSYSTEM

TECHNICAL FIELD

The present invention relates to a method and an arrangement in an IP Multimedia Subsystem (IMS) and in particular for allowing enterprise and personal domains in the IMS.

BACKGROUND

The present invention relates to methods in an IP Multimedia Subsystem (IMS) which is a standardised architecture for telecom operators that want to provide mobile and fixed multimedia services. It uses a Voice-over-IP (VoIP) implementation based on a 3GPP standardised implementation of SIP, and runs over the standard Internet Protocol (IP). Existing phone systems, both packet-switched and circuit-switched, are supported.

The IMS services are provided by a number of IMS operators in co-operation. This is illustrated by op1 120a to op6 120f in FIG. 1. These IMS operators op1-op6 120a-f are interconnected through a closed interconnect/transit structure 100, an example of such an interconnect network is the by GSM Association proposed IP Exchange or IPX network provided by a set of IPX operators IPX1-IPX3 130a-c. In case of using IPX the IMS operators are connected to a few IPX operators while all IPX operators are interconnected making sure that between any two IMS operators there is at most two IPX operators. The IPX structure 130a-c constitutes an IMS transit layer on top of the GRX network 100.

The GRX network 100 was created to facilitate GPRS roaming and is implemented as an IP network separated from the Internet. The separation is such that the GRX network has its own DNS hierarchy 110 completely isolated from the Internet DNS 140 hierarchy.

The structures of the IMS interconnect DNS databases are as distributed as the Internet Domain Name System (DNS) database; all operators operate and administrate the internal structure of the domains they are responsible for. Only the top level services are present on the GRX network, they in turn point at the different operators DNS:es.

In the IMS, the additional identities IP Multimedia Private Identity (IMPI) and the IP Multimedia Public Identity (IMPU) are used to identify the user. The IMPI and the IMPU is a URI such like a phone number comprising digits or a SIP-URI comprising alphanumeric identifiers like "jan.svensson@operator.com".

The IMPI is a unique identity normally stored at the ISIM that is used when registering a user in the IMS system and it is possible to have multiple IMPU per IMPI. The IMPU can also be shared with another phone, so both can be reached with the same identity (for example, a single phone-number for an entire family).

A user can have several Public Identities (IMPUs) that can be used in different situations. They can be seen as aliases so that the alternative IMPU "the plumber" can be used instead of the more formal IMPU "jan.svensson" if selected by the user Then, Jan Svensson will also when chosen be known as "the plumber" in the network. If another user wants to initiate a sip-call to Jan Svensson, in his role of "the plumber", he can be reached on the address "the plumber@operator.com".

If a user has several IMPUs they can be coupled together in implicit registered Id sets, meaning that when a user register with one of the IMPUs in the implicit registered Id set, the other IMPUs in the implicit registered Id set will also be registered.

The identities IMPU, IMPI, IMSI, and MSISDN are stored in the HSS (Home Subscriber Server) 204 shown in FIG. 2 that is the master user database supporting the IMS network entities that are actually handling the calls/sessions. Further, the HSS contains the subscription-related information (user profiles), performs authentication and authorization of the user, and can provide information about the physical location of user.

An IMS 200 connected to an access network 202 and to an IPX system 211 is illustrated in FIG. 2. An IMS user 201 connects to the IMS 200 via the access network 202.

The IMS network comprises a plurality of SIP servers and SIP proxies called CSCF (Call Session Control Function), used to process the SIP signaling packets in the IMS.

A P-CSCF (Proxy-CSCF) 203 is a SIP proxy that is the first point of contact for the IMS terminal.

An I-CSCF (Interrogating-CSCF) 208 is a SIP proxy located at the edge of an administrative domain. Its IP address is published in the DNS of the domain, so that remote servers (e.g., a P-CSCF in a visited domain, or a S-CSCF in a foreign domain) can find it, and use it as an entry point for all SIP packets to this domain. The I-CSCF queries the HSS to retrieve the user location, and then routes the SIP request to its assigned S-CSCF.

An S-CSCF (Serving-CSCF) 205 is the central node of the signaling plane. The S-CSCF downloads and uploads user profiles from the HSS since it has no local storage of the user.

Application servers (AS) 206 host and execute services, and interface with the S-CSCF using SIP. This allows third party providers an easy integration and deployment of their value added services to the IMS infrastructure.

An MRF (Media Resource Function) 207 provides a source of media in the home network. It is e.g. used for multimedia conferencing.

The I-BGF 210 is the border gateway function that is controlled by the I-BCF 209.

Users of IMS are allocated at least one Public User Identifier, referred to as IMPU above, of the address type SIP URI when they become IMS users. This has one identity part and one domain part. The domain name part is today always one of the domain names of the operator managing the user, thus taking the form ID1@op2.com or ID2@op5.com as indicated in FIG. 1. These identities can also be E164 numbers falling back to traditional telephony identifications in combination with domain names. They can also be aliases in case ID1 may be replaced with Al1 being an alias selected by the user ID1, and the same for the target user. The identities used are the one that the users want to publish and make known as their visible (by humans in end-points) IMS identities.

When the user ID1@op2.com wants to establish a session with the user ID2@op5.com the target address (ID2 or an alias) are put into the "To" field of the SIP invite signal. This Public User Identity is also populated in the "Request URI" field to be used in the SIP routing algorithms for example between the originating S-CSCF and the terminating I-CSCF in the involved IMS systems. The originating users identity ID1@op2.com is entered into the "From" field of the invite to provide a routable return address, and possible also a presentable identity of the calling party to the called party. FIG. 3 gives a SIP Invite example where this is shown.

The originating operator, op2, is the first to receive this invite. The invite is routed to the user's serving S-CFCF based on the parameters in the Route: header. After processing potential originating services the S-CSCF of the user at Op2 make a DNS lookup in the operator 2 internal DNS on the domain in the Request URI (op5.com) to find a routing direction, in this case as op5.com is not being served by this IMS domain it is pointing at the IPX Network and the entry point of IPX1. After some checking it is forwarded to IPX1 who in turn makes a DNS lookup in it's interconnect DNS on the domain in the request URI to find the next entry point. The entry point of IPX2 is found. The Invite is forwarded to IPX2 who do the same to find the entry point of op5. Op5 checks if the user ID2 is registered and, if so, forwards the invite to the S-CSCF where the user is served and routed the user's device via the P-CSCF handling the device.

The user ID2 device acknowledges the Invite signal and after user ID2 session acceptance the session is established.

Further, as stated above the SIP URI is built up of one individual part and one domain part defining the provider for the individual identity, ID@operator-domain.TLD, (TLD Top level Domain on the Internet, e.g. com) just like email addresses.

In the IMS standard it is assumed that the domain part actually points at the domain of the operator/provider and nothing else. This forms a problem for individuals and organizations that do not want to publish themselves as hosted by a provider but wants to be addressed through their private or their organizational domains.

One group is those that want their SIP URI to be like ID@private-domain.TLD, thus no operator/provider domain is present in that SIP URI.

Another group is organizations that want their SIP URI to reflect their organization rather that their provider domain like employee@enterprise-domain.TLD or member@organisation-domain.TLD, which imply that there is no operator/provider domain present in that SIP URI.

The IMS Standard has not shown how this can be achieved as of today. In all examples the provider domain is necessary for the communication between the functional entities inside each IMS provider's network implementation.

SUMMARY

Thus an object of the present invention is to achieve a method and arrangement for allowing private and enterprise domains in the IMS, which makes it possible to use a SIP URI like ID@private-domain.TLD.

The object is achieved by the arrangement according to the invention. The arrangement is configured to be implemented in a first operator network providing an IMS service to a first user by means of a first IMS interconnect network. The first operator network comprises a DNS system, wherein the DNS system comprises at least an external DNS and an internal DNS. The IMS interconnect network comprises at least an IMS interconnect DNS. According to the invention, the arrangement comprises an interface to the IMS interconnect DNS and the DNS system of the operator network to be used by the first user, and means for administering the IMS interconnect DNS and the DNS system of the operator network via said interface. The means for administering comprises means for establishing a private domain, e.g. enterprise.com. Means for connecting an IMS user as a member of the private domain by providing the IMS user to be connected an identity associated with the private domain such as id1@enterprise.com are also provided by the means for administering. In order to forward queries relating to users being members of the private domain to the external DNS of the first operator network means for inserting the requested private domain in the IMS interconnect DNS and in the DNS system of the operator network and means for inserting members of the private domain in the DNS system of the operator are provided by the means for administering. Moreover, means for establishing the identity associated with private domain as a private domain name based IMPU, also denoted alias, to the IMS identity of the user, to be connected, to the private domain, in the IMS interconnect network are provided by the means for administering.

The object of the invention is also achieved by the method according to the invention. The method comprises the steps of providing an interface to the IMS interconnect DNS and the DNS system of the operator network to be used by the first IMS user, and providing an administration support to the IMS interconnect DNS and the DNS system of the operator network via said interface. The step of providing an administration support comprises establishing a private domain, connecting an IMS user as a member of the private domain by providing the IMS user to be connected an identity associated with the private domain, inserting the requested private domain in the IMS interconnect DNS and in the DNS system of the operator network and inserting members of the private domain in the DNS system of the operator network such that queries relating to users being members of the private domain are forwarded to the external DNS of the first operator network, and establishing the identity associated with private domain as a Private domain name based IMPU also denoted alias to the IMS identity of the user, to be connected, in the IMS interconnect network.

The advantage with the present invention is that it removes to need for users to publish themselves as users of a particular operator, since the users are able to establish an own private domain. It enables the use of any Internet domain within the IMS system. Enabling personal domains also enables that users can keep there personal identity while changing IMS operator. A user that has subscribed to the domain administration can keep that while all users of the domain are IMS users with other IMS operators and decide to change domain administrator as well.

BRIEF DESCRIPTION OF THE DRAWINGS

FIG. 3 illustrates a SIP invite according to prior art.

FIG. 9 illustrates schematically the DNS structure the solution of the present invention is based on.

DETAILED DESCRIPTION

The aim of the present invention is to make it possible to allow private domains in the IMS, which makes it possible to use a SIP URI like ID@private-domain.TLD. It should be noted that the private domain may be an enterprise domain such as enterprise.net.

The GRX network was created to facilitate GPRS roaming and is implemented as an IP network logically separated from the Internet. The separation is such that the GRX network has its own DNS hierarchy completely isolated from the Internet DNS hierarchy.

The solution of the present invention is based on that the above mentioned separation also isolates the IMS interconnect/transit DNS structure from the Internet DNS and thereby enables the IMS providers and IMS transit providers to offer a registrar service offering the ability to administrate private and enterprise domains.

The proposed solution is further based on that the DNS data architecture allows SIP records for each individual of a domain, the fact that IMS allows individual users to have multiple public identities that can be defined as aliases and that IMS allow the aliases to have any of the forms above, e.g. ID@private-domain.TLD. It should be noted that alias is also referred to as Private domain name based IMPU in conjunction with the present invention.

Figure 6:
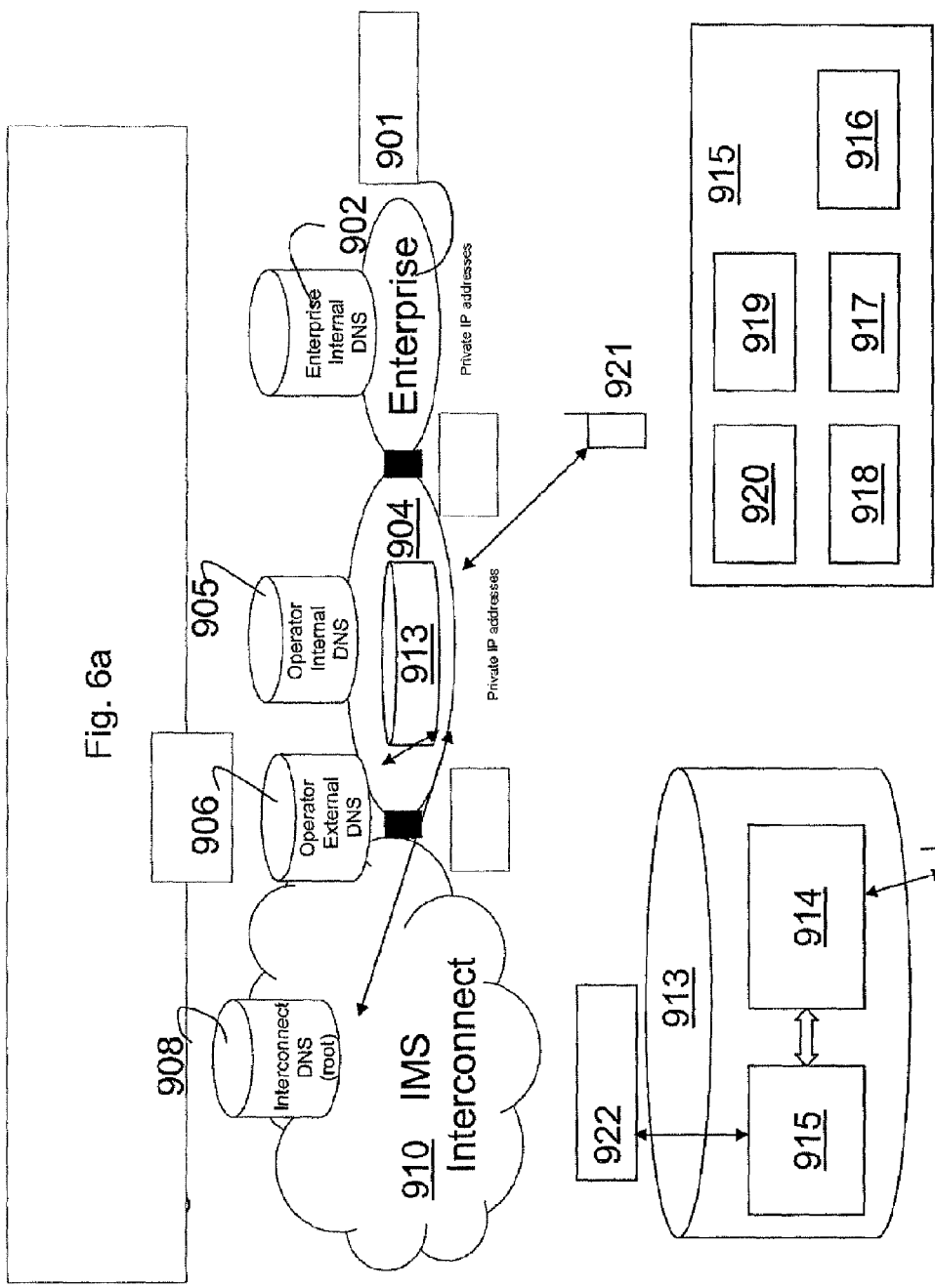
FIG. 6 illustrates schematically the arrangement according to the present invention.

The arrangement 913 according to the present invention is illustrated in FIG. 6a when implemented in an operator network 904. The operator network 904 comprises an internal DNS 905 and an external DNS 906 and provides an IMS service to the users 921 of the operator network 904 by means of an IMS interconnect network 910. The IMS interconnect network comprises an IMS interconnect DNS 908. By using the arrangement of the present invention a private domain 901 (illustrated by an enterprise domain in FIG. 6a) may be requested. The private domain 901 may comprise an internal DNS 902.

FIG. 6b illustrates the arrangement 913 comprising an interface 914 for the user 921 of the operator network 904 requesting the enterprise domain 901. By means of the interface, the user 921 may access an administration support 915. The administration support makes it possible for the user 921 to manage the DNS system 922, i.e. the DNS:s of the operator network and of the IMS interconnect. The DNSs of the operator network comprises the external and internal DNS of the operator network and possibly the internal DNS of the private network. The administration support is illustrated in FIG. 6c and comprises means for establishing a private domain 916 e.g. en5.net, means for connecting 917 an IMS user as a member of the private domain by providing the IMS user to be connected an identity en5-id1@en5.net associated with the private domain en5.net, means 918 for inserting the requested private domain en5.net at least in the IMS interconnect DNS and the external operator DNS, means 919 for inserting the connected members in the DNS system 922 of the operator network such that queries relating to IMS users being members of the private domain are forwarded to the external DNS of the first operator network, and means for 920 establishing the identity en5-id1@en5.net associated with private domain as an alias, i.e. the Private domain name based IMPU associated to the IMS identity of the connected user in the IMS interconnect network.

The arrangement is as illustrated by FIG. 6a configured to be implemented in nodes in the first operator network, wherein the first operator is the operator that is responsible for the requested private domain. The arrangement is the configured to communicate with the IMS interconnect DNS and preferably also with the DNS structure of the operator network shown in FIG. 6a and with the DNS structure of other operator networks. A user of the operator network being responsible for the private domain, i.e. the administrator of the private domain, may access the arrangement of the present invention by a computer via a web interface.

By using the present invention, an operator is able to provide a new "private IMS domain hosting" service that enables end-users and enterprises to host their private name based IMS domains e.g. enterprise.net together with a Private domain name based IMPU" management service that couples the private domain based identities to an operator based identity such as operator.com.

The "private IMS domain hosting" service corresponds to the registrar on the Internet today (described on http://www.icann.org/registrars/ra-agreement-17may01.htm#3). An Internet domain registrar provide the ability to request an Internet domain, like johanssons-ror.com, and provide administration tools to control web or mail structures on that domain. This is today a service frequently used by private persons and small companies.

The "private IMS domain hosting" service is primarily adapted to operate on an operator owned and managed DNS that is populated with domain and sub-domain data for the domain names the operator has the authority to handle and host in the interconnect network.

This ensures that IMS interconnect traffic destined to a user with private domain based IMS IMPU is directed to the operator that is hosting/managing that private IMS domain.

Further the private domain management described below contains the function of assigning the IMPU based on the private domain as an alias, i.e. a Private domain name based IMPU, within the IMS system at the IMS operator that is hosting this particular user.

As indicated above all users within the private domain do not have to be users of the same IMS operator. One operator may provide the "private IMS domain hosting" service while the "private domain name based IMPU management" is residing by another operator where the individual user is hosted.

A session is established by using a DNS system in order to determine how the session routing should be performed. The DNS that is used is the IMS interconnect DNS and the DNS of the operator hosting the private domain while the session routing is directed to the operator determined by the DNS response.

When providing the "private IMS domain hosting" service, it is important that the IMS private and enterprise domain names become a true subset of domain names and domain name hierarchy used in the Internet. If someone requests a specific domain name on IMS the identical Internet domain name must already be allocated to the same person or organization. As a consequence the IMS DNS system must allow the complete TLD name space of the Internet. This is already the case as the operator domain names (op1.com) may need to be identical on the IMS DNS's and the Internet DNS's.

Figure 4:
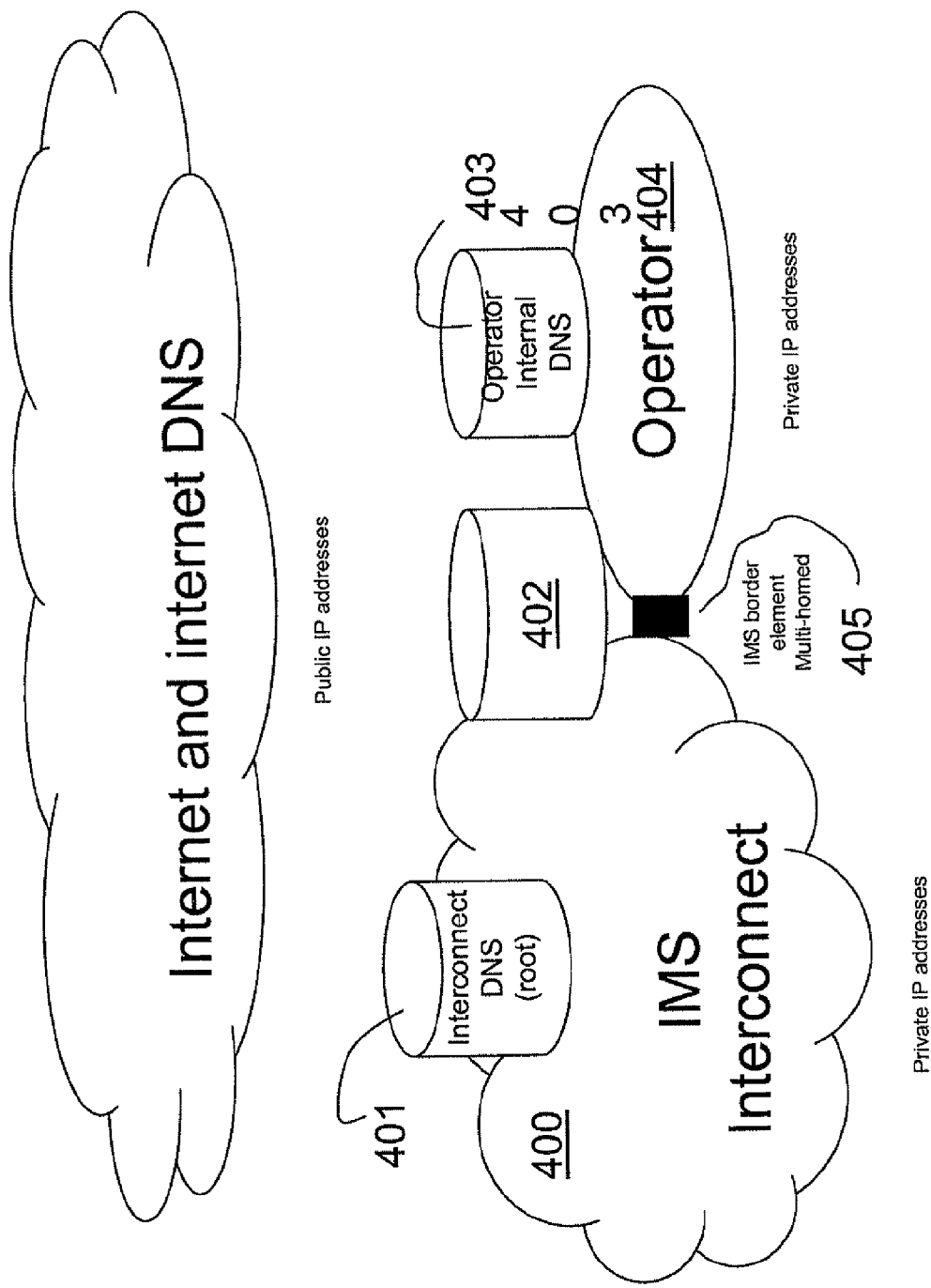
FIG. 4 illustrates schematically the DNS structure of the IMS interconnect network and of the operator according to the present invention.

The IMS Interconnect DNS structure 401 shown in FIG. 4 is used inside the IMS interconnect network 400 and by the IMS border elements 405 when looking up the routing destination of the request URI in the IMS Interconnect network 400 (outbound from operator traffic). In addition to the IMS Interconnect DNS structure an external operator DNS 402 is provided that is populated with domain and sub-domain data for the domain names the operator 404 has the authority to handle in the interconnect network. The Operator internal DNS 403 is used inside the operator network and by the IMS border element 405 for inbound traffic. Inbound traffic implies traffic from the interconnect network to the own network and outbound traffic implies traffic from the own network to the interconnect network.

Figure 1:
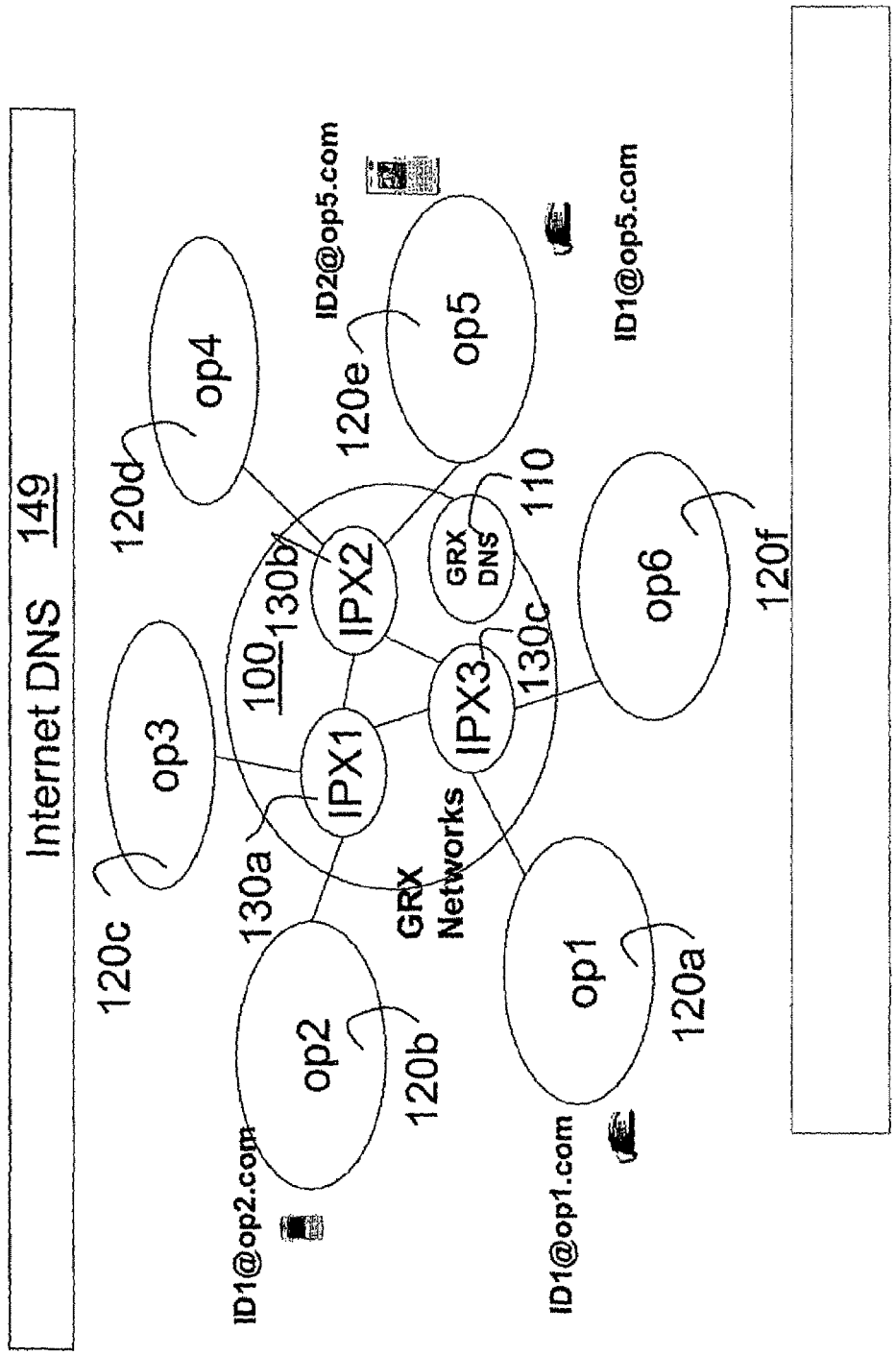
FIG. 1 illustrates a domain/provider structure in an IMS according to prior art.
Figure 2:
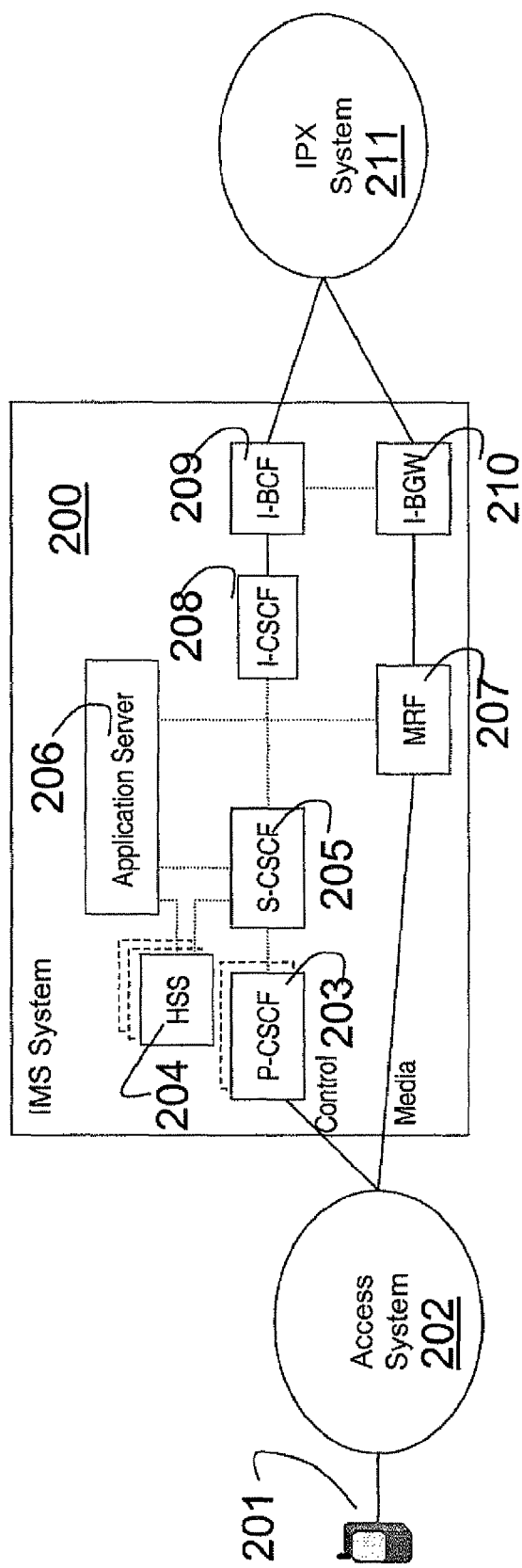
FIG. 2 illustrates an IMS according to prior art.
Figure 5:
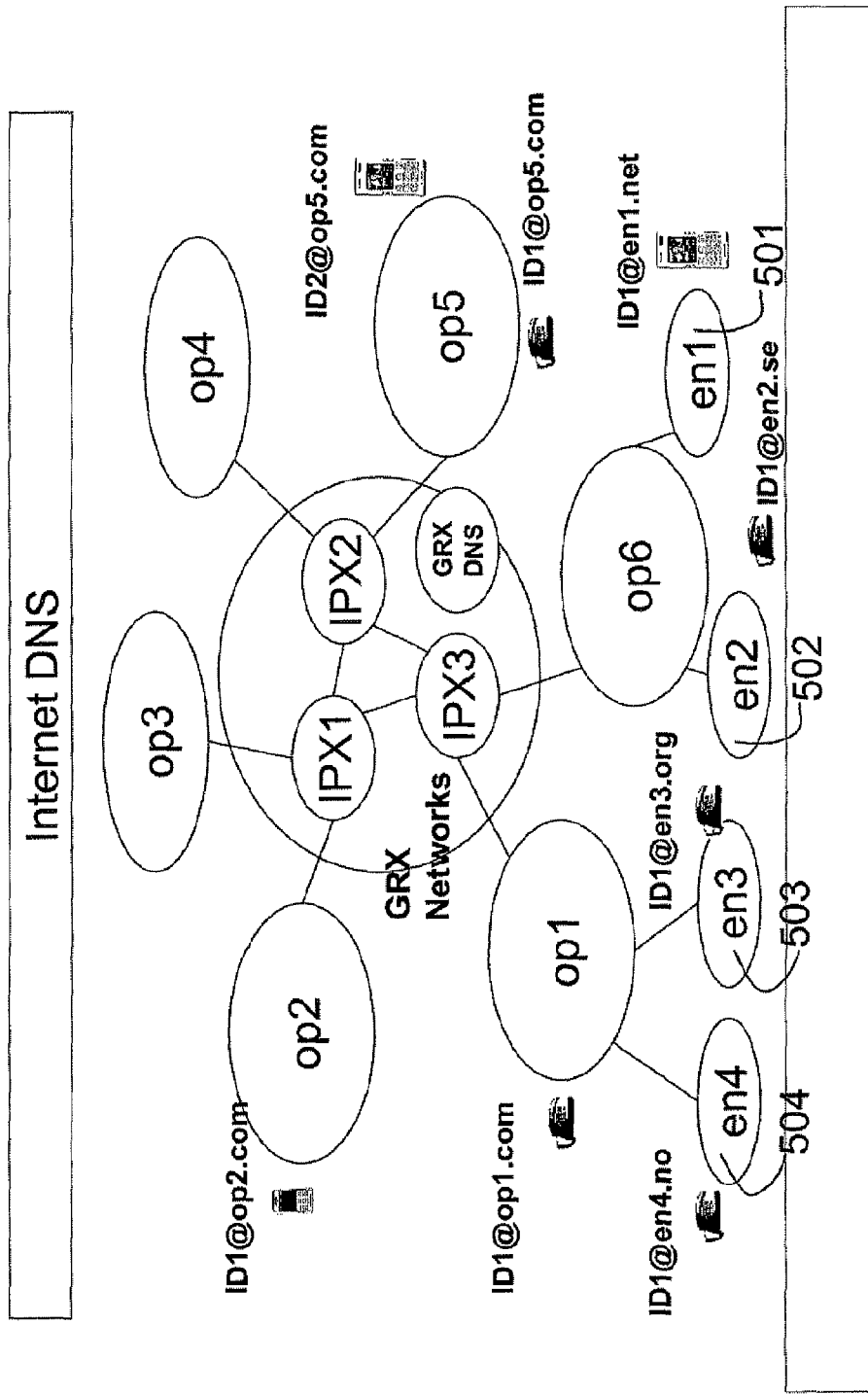
FIG. 5 illustrates enterprise IMS systems (IMS PBX) as an IMS operator substructure according to the present invention.

FIG. 5 corresponds to FIG. 1 except that the enterprise IMS systems 501-504 at a sublevel are entered into the picture. The users of these enterprise systems require to be identified by their enterprise domain identity that has a similar structure as their email address and may be identical to their email addresses (ID1@en4.no, id1@en3.org, ID1@en1.se, id1@en1.net).

To enable any IMS user to have e.g. ID1@en1.net as target address, in the "To" field and in the "Request URI" field, the operator network op6 comprises means for accessing the DNS structure of the IMS interconnect network such that the en1.net domain points to the entry point of the operator network op6 for SIP services inside the IMS interconnect network. I.e., this implies that it is ensured that all IMS and IPX operators understand that ne1.net is found behind op6 in an interconnect perspective. Furthermore the Op6 operator network must populate its internal IMS DNS with en1.net domain and ensure that it for SIP services points at the entry point for Op6 enterprise IMS transit services, in case enterprise IMS transit services are provided for en1 by Op6, or that it points to en1 IMS border element in the Op 6 network.

Managing the IMS DNS's in this manner is part of the agreement between the operator (op6) and the Enterprise (en1). In this relation the operator op6 also checks that the domain ne1.net is a valid domain in the Internet DNS and that it is owned and paid for by en1, which is a prerequisite for the validity of the agreement. In all other aspects the session setup is identical to the one described above.

Hence, if the user ID1@en4.no calls id1@en1.net the "To" field and the "Request URI" are set to id1@ne1.net while the "From" field is set to ID1@ne4.no. Op1 has entered en4.no into the IMS DNS's in the same manner as op6 did for en1.net.

Figure 7:
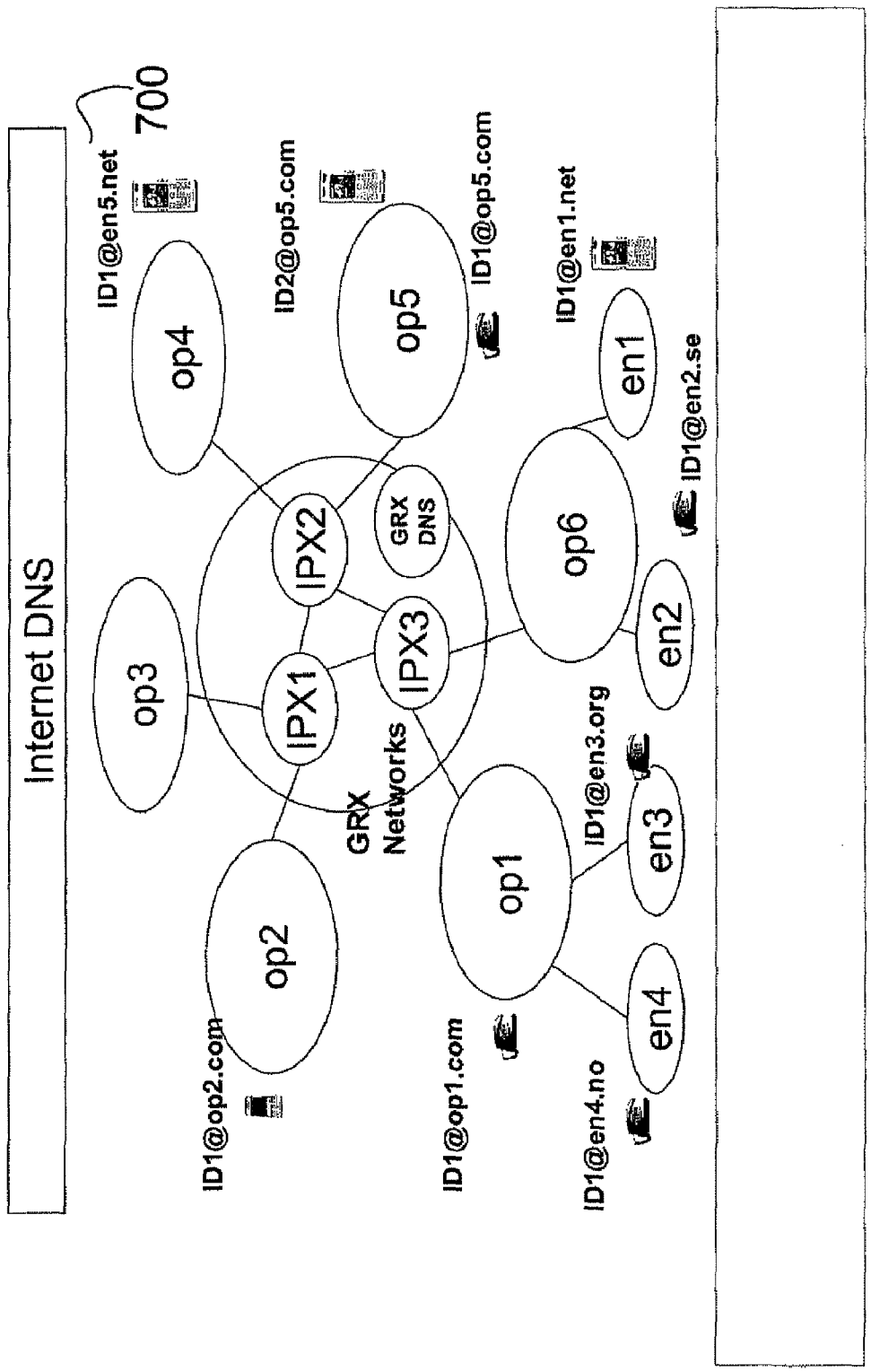
FIG. 7 illustrates the IMS operator structure wherein enterprise communication is provided as centrex according to an embodiment of the present invention.

In FIG. 7 enterprise users 700 are introduced as Centrex users (to op4 in this example), that is they are end users in the IMS operator system but treated as a specific group with a specific identification structure and potentially group specific services. (Centrex is a PBX-like service providing switching at a central office instead of at the customers' premises.) This requires more of the IMS solution than just managing the IMS DNS's.

In order to support Centrex users the serving operator IMS needs to provide enterprise services to these users. In order to do so the enterprise specific IMPU's like ID1@en5.net needs to be handled in the op4 network and the IMS interconnect.

In this case the IMS DNS management is in principle equal to the connected enterprise case but for the fact that the enterprise may not have a DNS of its own (in the case all it's users are directly attached to the operator network, and not via an enterprise located local IMS system). The functionality as mentioned above must be provided by the IMS operator. The enterprise has still a need to manage their users and their identities. In this case op4 offer a management interface to their Centrex user handling making local management possible.

The above described management is based on the capability to bind IMPU based on private domain names (ID1@en1.net) to an IMPU containing operator domain name (op6.com).

Figure 8:
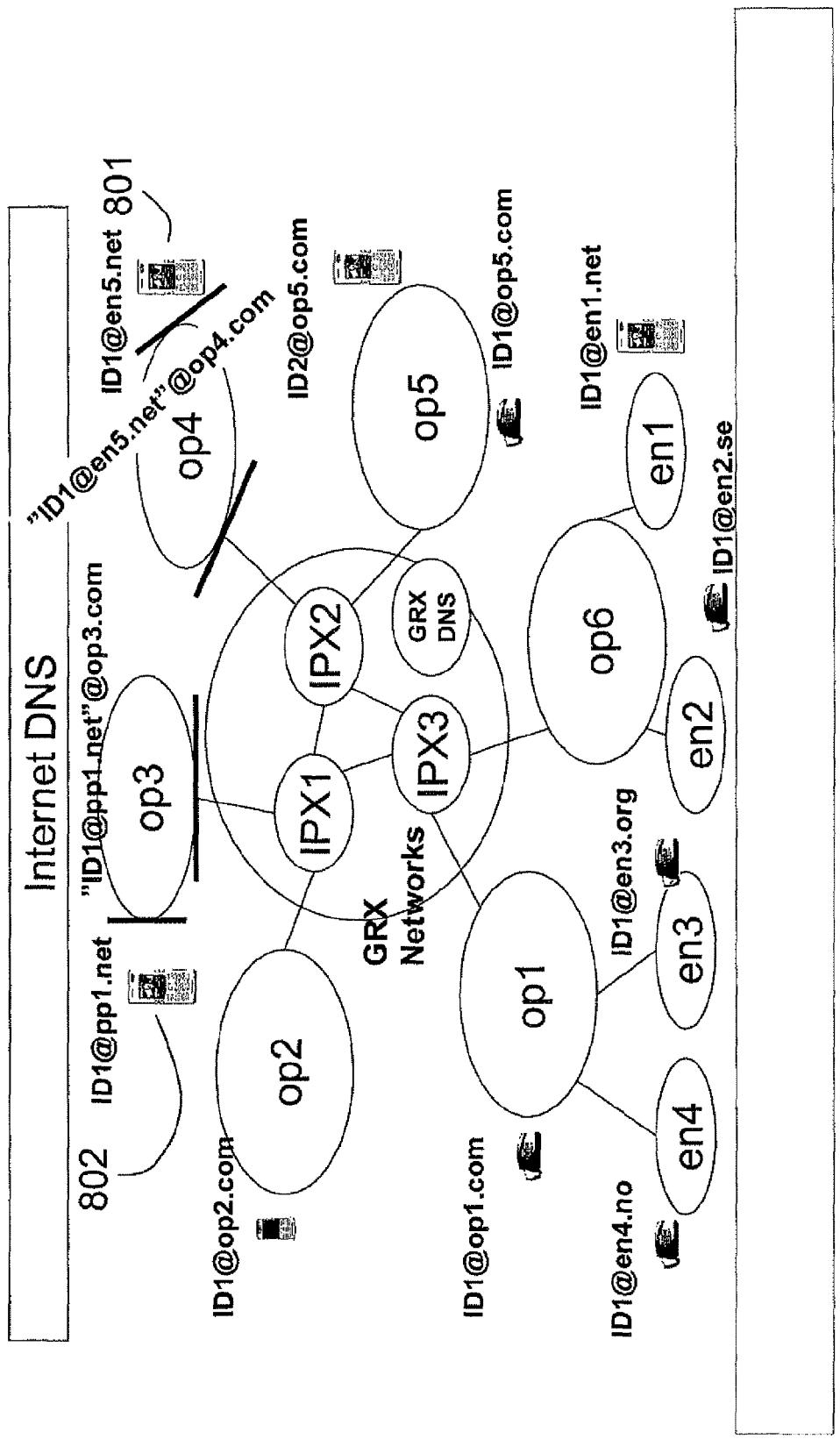
FIG. 8 Private domain support added

In FIG. 8 the concept of private domains supporting also single individuals 801, 802 that want their published IMS identity to equal their already published email identity is added. The structure of this problem is similar the Centrex problem so the solution is the same. The management described above also solves the private domain management. Owners of private domains on the Internet are required to manage the user structure of their domain and are required to do so also in the IMS environment.

Further, it can not be assumed, as in this description so far, that all users in one domain are users of the same IMS operator. In the Centrex case, some users in the en5.net may belong to op3 and not op4 as most of them do. The solution must cater for that.

Thus the solution of the present invention must also cater for exposure and management of private domains in the closed IMS interconnect network, and association of the private domain based IMS IMPU with a user definition based identity defined by the operator, so that charging and operator trust can be provided based on an operator owned IMPU and make the private domain based IMS IMPU be the one IMPU that is seen and used by end-users.

According to the present invention the above mentioned problems are solved by providing "private IMS domain hosting" service as a stand-alone service, coming closer to the registrar structure on the Internet which is an isolated service not tied to any other service. In this case this implies that for example op4 being the prime contractor of en5 private name based IMS identity management for all users of the domain en5.net.

Figure 9:
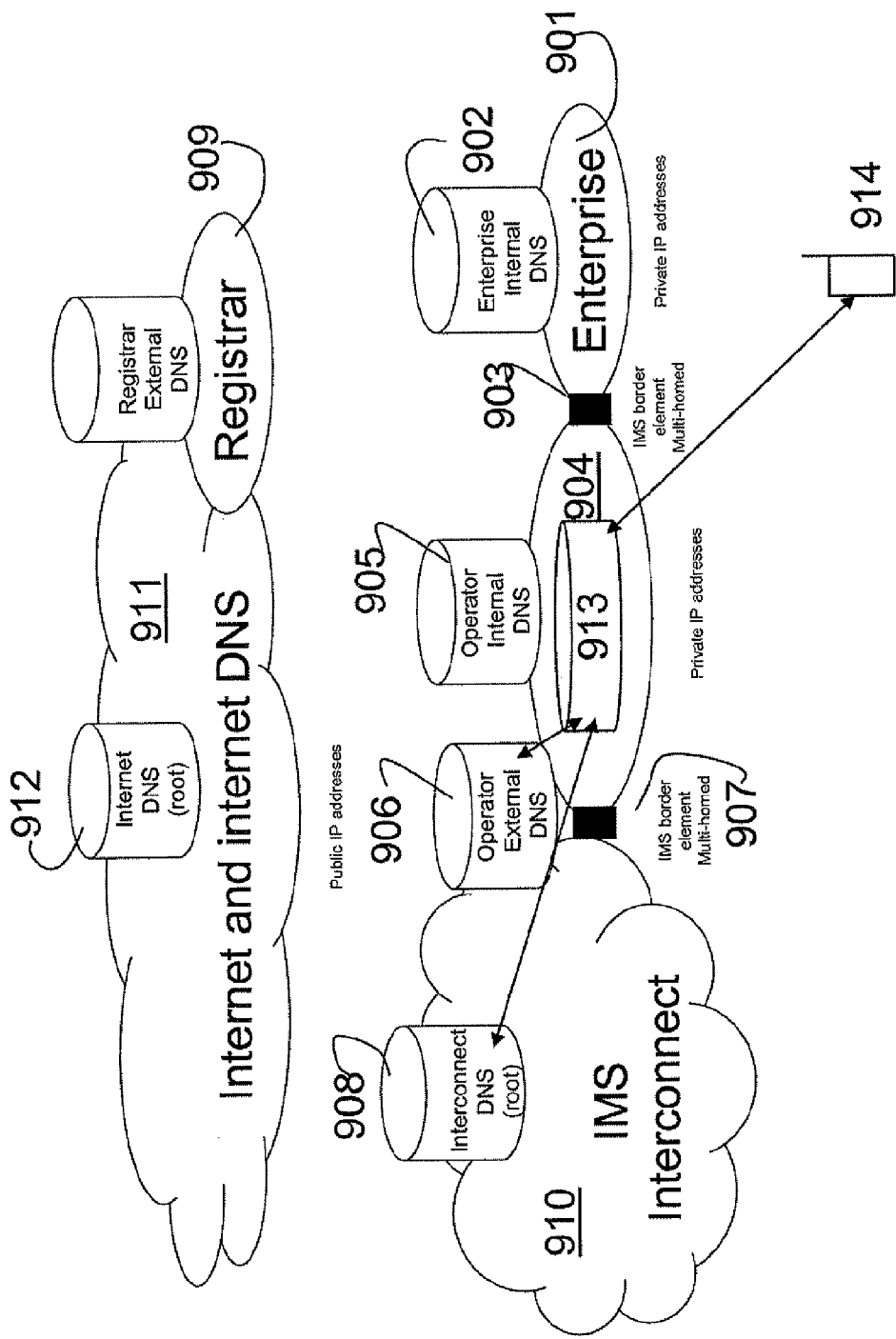

To further describe the invention the example below is provided in conjunction with FIG. 9 illustrating a DNS system wherein the claimed enterprise domain comprises an internal DNS.

The Internet DNS forms the base and the norm for the data manipulation that is needed. The enterprise domain En5.net is claimed on the TLD.net by the enterprise En5 901.

If the entity claiming the domain, e.g. an enterprise 901 has an internal DNS 902, the Internet DNS 912 is pointing at the enterprise internal DNS 902 for the internal domain structure. The member addresses on that domain are managed by the enterprise 901 in the Enterprise internal DNS 902.

If the entity 901 claiming the domain has no internal DNS of its own, a registrar 909 on the Internet 911 can be used to provide a management interface making it possible for the domain owner to manage domain internal structure as well as members' addresses of that domain. This also enables domain members to get their active services (like email) from different actors on different domains while still present themselves and to be reachable as members of this particular domain En5.

In order to describe the present invention, three scenarios are provided. In the scenarios, different participants (users) are described assuming different roles.

First, the user who is responsible for the private domain is the user who requests the private domain. This user assumes the roles of: ordinary IMS subscriber of the operator that is responsible of the private domain referred to as the first operator, administrator of the private domain and a member of the private domain.

Then there are ordinary IMS subscribers of the first operator that also shall become members of the private domain and then ordinary IMS subscribers at other operators that also shall become members of the private domain. The fact that the IMS Interconnect DNS is isolated from the Internet DNS requires the above-mentioned Internet registrar service exist within the IMS Interconnect DNS environment as well. This is described below.

In the domain initiation procedure the user who requests the private domain, referred to as the IMS Private domain administrator, is established as an IMS user and as the responsible for the private domain, i.e. as an administrator for the private domain. The user is also a member of the private domain and as a member he is provided a Private domain name based IMPU in the network of the operator that is responsible of the private domain. The procedure is described below:

1. A user who has claimed a private Internet domain for himself or his enterprise (En5.net) 901 subscribes to the IMS service of his operator.
2. The user is provided a Private User Id and a Public User Id by the operator, both containing the operator's domain.

The user is now given the role of IMS private domain administrator and provided access to an administration support by the operator preferably by using his PC and its browser. The operator provides e.g. a Web interface to facilitate a more convenient management of each user account. All IMS users have the possibility to administrate their own IMS subscription by the administration support, e.g. via the web interface. By using the administration support, the user is able to request a private domain and hence be established as responsible for the requested domain. The operator inserts the requested domain in the IMS interconnect DNS.

3. The user (IMS private domain administrator) enters a private domain management part of the administration support and requests the operator 904 to enable his private domain (En5.net) in the IMS environment.

The domain initiation procedure at the operator side is described below:

1. The operator network is adapted to check that the entity responsible for the private domain (En5.net) on the Internet is identical to the entity responsible for the IMS subscription currently logged on to the administration function. The check of the Internet domain responsibility may be done by using the http://www.uwhois.com/ service. The result is then compared with the IMS subscription data. The fact that the domain exists on the Internet assures that the domain is globally unique.
2. The operator network is adapted to update the IMS Interconnect DNS with the requested private domain so that all queries on the private domain are forwarded to the operator's external DNS. I.e. the IMS Interconnect DNS comprises a pointer to the external DNS of the operator.
3. The operator network is adapted to enable its external DNS to be managed by this specific IMS user (i.e. the IMS private domain administrator). This enables this specific user to manage all members of the requested domain even if they are not users of this operator's IMS service.

The IMS user (i.e. the IMS private domain administrator) can now start to populate his domain with members.

If the entity claiming the domain (e.g. an enterprise administering its own domain) has an internal DNS of its own, it is possible to make the operator external DNS 906 point to the internal DNS instead and then populate that DNS with the members of the domain. The internal domain DNS is reachable also for the Internet DNS, and thus reachable for both IMS and non IMS requests. The external DNS of the operator is a part of the IMS interconnect and not available from the Internet. The private domain must be known by the external DNS of the operator but all inquiries relating to the private domain may be directed to the internal DNS of the enterprise where all members of the private domain are administered.

Here, the user that is the administrator connects another user of the first operator to the private domain. In this case, the private domain does not have a DNS of its own. The procedure for connecting users from the same operator's IMS Service is described below.

1. The user, i.e. the IMS private domain administrator, is identified as having the rights required for administrating the private domain En5.net.
2. The user, i.e. the IMS private domain administrator, enters the administration support of the domain En5.net.
3. The user, i.e. the IMS private domain administrator, establishes the identity of the new user En5-Id2 as being a valid user of the private domain En5.net. He also defines the operator entry point for that user as the current operator by entering the domain name, the FQDN, of that operator.

The corresponding procedure performed by the operator network is described below:

1. The new member of the private domain is a user that is a subscriber of the operator being responsible of the private domain. The operator network is then adapted to check that the requested ID on En5.net is unique on the private domain.

The operator network is adapted to configure its external DNS such that an SRV record associated with the domain En5.net defines the id En5-Id2 pointing to the Fully qualified Domain Name (FQDN) of the current operator network's entry point from the IMS interconnect network. The SRV record is a record of a user in the operator's external DNS that informs other IMS systems where the said user can be found. This FQDN contains the current operator network domains already present in the IMS Interconnect DNS. Thus, the operator network having the private domain and the path to it can be found by all operators connected to the IMS Interconnect network according to normal procedures. Hence the user associated to the Private domain name based IMPU (the alias) can be reached by any other IMS.

The user who has become a member of the private domain is referred to as the specific user, and he has as mentioned above received an identity associated with that private domain. The received identity must be registered as a Private domain name based IMPU to his IMS identity. The private domain administrator or the user himself can do that. If the user himself takes care of that administration the procedure towards the private domain responsible operator and other operators will be equal.

1. The user (IMS private domain administrator) enters the administration of the IMS subscription of the specific user and establishes that user as a user of the En5.net domain by requesting a Private domain name based IMPU En5-Id2 to his Private User Id and a Public User Id that has the form En5-Id2@En5.net.

The corresponding procedures at the operator is described below:

1. The operator network is adapted to configure the internal network such that the identity of the private domain En5-Id2@En5.net is a valid IMPU inside the operators IMS domain and thus included in the HSS of the IMS. Thus, the user associated to the Private domain name based IMPU can be reached by any other user of the current operator.
2. The user is now a valid user of the domain EN5.net and can be reached under the SIP URI En5-Id2@En5.net.

When the private domain administrator connects users of other operators, the private domain administrator provides an identity to be used in the private domain similar to the case when the connected user belongs to the first operator network. The procedure for connecting users from other operators IMS Services differs from the case when the connected user belongs to the first operator network. The difference is that when the connected users belong to the first operator, the private domain administrator is able to handle all administration. When the connected user belongs to another operator, the private domain administrator is not known in the other network, therefore the user to be connected has to handle all the administration himself. That implies that the arrangement according to an embodiment is made accessible for other users than the administrator.

Thus a user of the other operator to be connected to the private domain receives an identity from the private domain administrator.

1. The user responsible for the private domain, i.e. the private domain administrator, has to be connected and authenticated. He (the private domain administrator) also has to insert the identity of the new member in the private domain.
2. The user (private domain administrator) is identified as having the rights required for administrating the private domain En5.net.
3. The user (private domain administrator) enters the administration support of the domain En5.net.
4. The user (private domain administrator) establishes the identity of the new user En5-Id3 as being a valid user of the domain En5.net. He also defines the operator entry point for that user as the current operator by entering the domain name, the FQDN, of that other operator. This binding between the user identity and the operator is stored in the external DNS of the domain responsible operator.

The corresponding procedures at the operator are described below:

1. The operator network is adapted to check that the requested ID on En5.net is unique on that domain. The operator network is adapted to configure its external DNS such that an SRV record associated with the domain En5.net defines the id En5-Id3 pointing to the FQDN of the current operator networks entry point from the IMS interconnect network. This FQDN contains the current operator's domain already present in the IMS Interconnect DNS. Thus, operator network having the private domain and the path to it can be found by all operators connected to the IMS Interconnect network according to normal procedures. Thus, the user associated to the Private domain name based IMPU can be reached by any other IMS.

The user of the other operator to be connected to the private domain, referred to as the specific user, is required to register the received identity of the private domain as an Private domain name based IMPU in the IMS system of the other operator. The procedure for connecting users from other operators IMS Services at a specific user is described below.

The specific user enters the administration of his IMS subscription and establishes himself as a user of the En5.net domain by requesting an Private domain name based IMPU to his Private User Id and a Public User Id that has the form En5-Id3@En5.net.

The corresponding procedures at the operator is described below:

1. The operator network is arranged to configure the internal network such that the Private domain name based IMPU En5-Id3@En5.net is a valid Private domain name based IMPU to the users Public User Id in the HSS. Thus the user associated to the Private domain name based IMPU can be reached by any other user of the current operator. If user A wants to reach En5-Id3@En5.net, user A uses En5-Id3@En5.net as the address. The operator of user A looks up the user of En5-Id3@En5.net via IMS Interconnect DNS and the domain responsible operator's external DNS and determines the operator the user of En5-Id3@En5.net and routs the session to that operator.

The user is now a valid user of the domain EN5.net and can be reached under the SIP URI En5-Id3@En5.net.

Further, the IMS operator is able to provide the "private IMS domain hosting" service to manage a private virtual/hosted IMS domain and to assign identities to users of that domain etc by means of the invention. The operator network according to embodiments of the invention is adapted to:

control that the requested private IMS domain (johanssons-ror.com) is already a valid Internet domain, thus guaranteeing that it is globally unique. It must also ensure that it is owned by the same legal entity that is claiming the IMS domain.

assign an IMS public user ID (IMPU) based on the private domain (e.g. gustav@johanssons-ror.com) and ensure that it is unique in that domain.

manage the particular IMS interconnect DNS so the private IMS domain is understood within the IMS Interconnect community. The IMS Interconnect DNS must also point at the operator external DNS describing the members of the domain. This makes an enterprise domain (e.g. En5.net) available to all IMS users.

manage the addresses of the individual members of the private and enterprise IMS domain and there respective relations to the different operators. This makes each member of the domain (En5.net) available to all IMS users regardless of which IMS operator domain they are members of.

Figure 10:
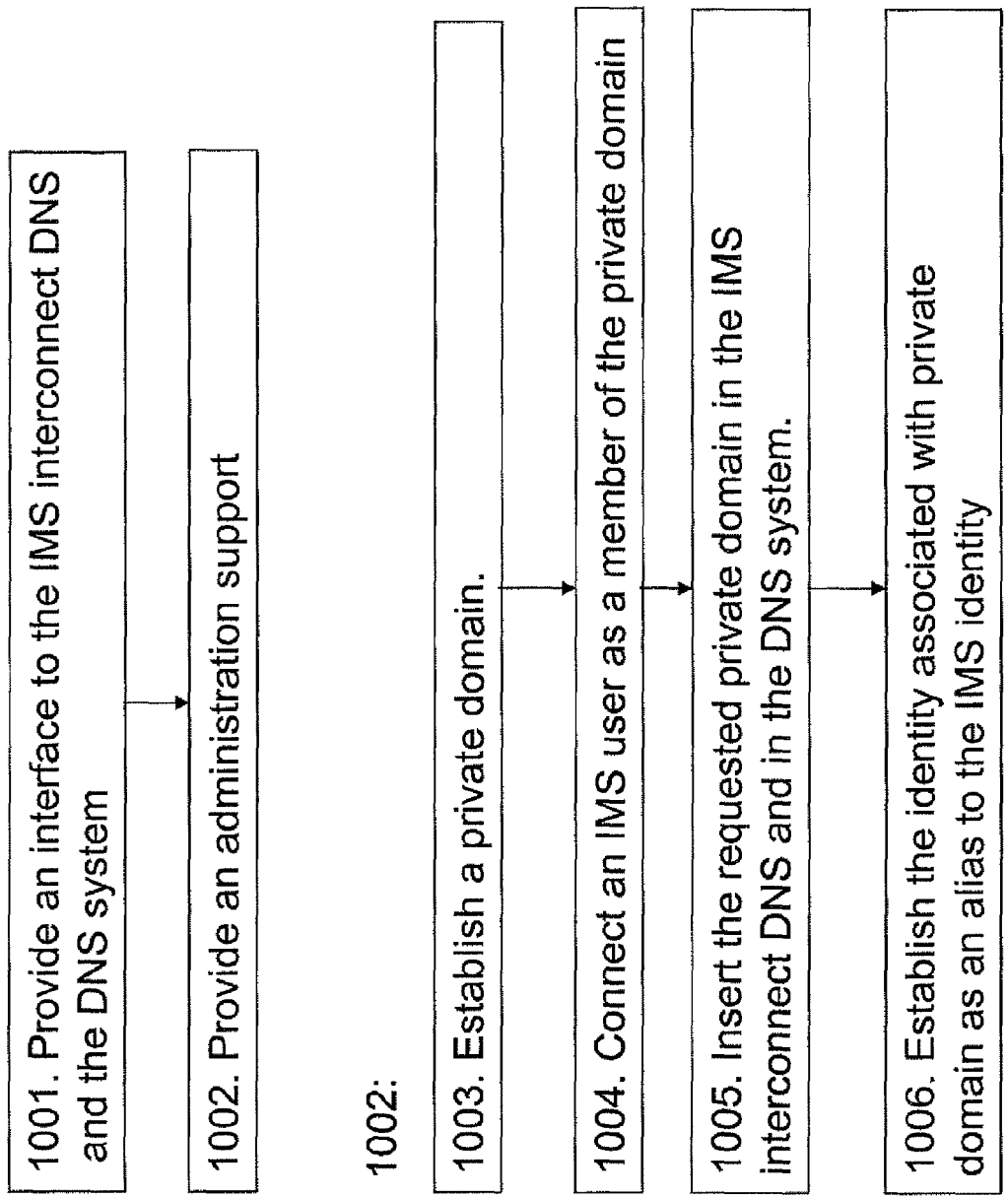
FIG. 10 illustrates schematically the method according to the present invention.

Further, the method according to the present invention is illustrated by the flowchart of FIG. 10. The method comprises the steps of:

1001. Provide an interface to the IMS interconnect DNS and the DNS system of the operator network to be used by the first IMS user.

1002. Provide an administration support to the IMS interconnect DNS and the DNS system of the operator network via said interface.

The step 1002 further comprises the steps of:

1003. Establish a private domain.

1004. Connect an IMS user as a member of the private domain by providing the IMS user to be connected an identity associated with the private domain.

1005. Insert the requested private domain in the IMS interconnect DNS and in the DNS system of the operator network and inserting members of the private domain in the DNS system of the operator network such that queries relating to users being members of the private domain are forwarded to the external DNS of the first operator network.

1006. Establish the identity associated with private domain as an Private domain name based IMPU to the IMS identity of the user, to be connected, in the IMS interconnect network.

The invention claimed is:

1. An arrangement for a first operator network providing an IP Multimedia System (IMS) service to a first user by means of an IMS interconnect network, the first operator network comprises a Domain Name System (DNS) system comprising at least an external DNS to the first operator network and an internal DNS to the first operator network and the IMS interconnect network comprises at least an IMS interconnect DNS, wherein the arrangement comprises an interface to the IMS interconnect DNS and the DNS system of the operator network to be used by the first user, and means for administering the IMS interconnect DNS and the DNS system of the operator network to be used by the first user via said interface, the means for administering comprising:
  a processor adapted to establish a predefined domain,
  the processor further adapted to connect a user as a member of the predefined domain by providing the user, to be connected, an identity associated with the predefined domain,
  the processor further adapted to insert the established predefined domain in the IMS interconnect DNS and in the DNS system of the operator network to be used by the first user and
  the processor further adapted to insert members of the established predefined domain in the DNS system of the operator network to be used by the first user such that queries relating to users being members of the established predefined domain are forwarded to the external DNS of the first operator network,
  the processor further adapted to establish the identity associated with established predefined domain as a Private domain name based IMS public user ID (IMPU) associated to the IMS identity of the user, to be connected, to the established predefined domain, in the IMS interconnect network, and
  wherein the processor is further adapted to configure the external DNS of the operator network to be used by the first user such that a service (SRV) record associated with the established predefined domain is configured to define the identity of a member of the established predefined domain and is configured to point to said member's Fully qualified Domain Name of the operator network's entry point from the IMS interconnect DNS.

2. The arrangement according to claim 1, wherein the processor is further adapted for checking that the first user is authorized for administering the established predefined domain.

3. The arrangement according to claim 1, wherein the processor is further adapted for checking that the established predefined domain name based IMPU is unique on the established predefined domain and on the Internet and that the first user requesting the established predefined domain also is responsible for the domain on the Internet having the same identity as the established predefined domain.

4. The arrangement according to claim 1, wherein, the processor for establishing the identity associated with established predefined domain as a Private domain name based IMPU associated to the IMS identity of the user to be connected in the IMS interconnect network is managed by a second user of a second operator, wherein the second user of the second operator is the user to be connected as a member of the established predefined domain.

5. The arrangement according to claim 1, wherein the processor for establishing the identity associated with the established predefined domain as a Private domain name-based IMPU associated to the identity of the user to be connected in the IMS interconnect network is managed by a third user of the first operator.

6. The arrangement according to claim 1, wherein the processor for establishing the identity associated with established predefined domain as a Private domain name based IMPU is adapted to configure the IMS interconnect network such that the identity associated with the established predefined domain is a valid Private domain name based IMPU to the user's IMS identity in the Home Subscriber Server (HSS) of the operator network which the user is connected to.

7. The arrangement according to claim 1, wherein the established predefined domain is an enterprise domain.

8. The arrangement according to claim 7, wherein the DNS system of the operator network comprises internal DNS of the enterprise network, whereby the external DNS of the operator network is adapted to point to the internal DNS of the enterprise network, and the processor for inserting members of the established predefined domain is adapted to insert the members in the internal DNS of the enterprise domain.

9. A method for a first operator network providing an IP Multimedia System (IMS) service to a first user by means of an IMS interconnect network, the first operator network comprises a Domain Name System (DNS) system comprising at least an external DNS to the first operator network and an internal DNS to the first operator network and the IMS interconnect network comprises at least an IMS interconnect DNS, comprising:
  providing an interface to the IMS interconnect DNS and the DNS system of the operator network to be used by the first user;
  providing an administration support to the IMS interconnect DNS and the DNS system of the operator network, to be used by the first user, via said interface, wherein the step of providing an administration support comprises establishing a predefined domain;
  connecting a user as a member of the predefined domain by providing the user to be connected an identity associated with the predefined domain;
  inserting the established predefined domain in the IMS interconnect DNS and in the DNS system of the operator network to be used by the user and inserting members of the established predefined domain in the DNS system of the operator network to be used by the user such that queries relating to a user being a member of the established predefined domain are forwarded to the external DNS of the first operator network;
  establishing the identity associated with the established predefined domain as a Private domain name based IMS public user ID (IMPU) associated to the IMS identity of the user, to be connected, in the IMS interconnect network; and
  wherein the step of inserting the established predefined domain in the IMS interconnect DNS further comprises the step of configuring the external DNS of the operator network to be used by the first user such that a service (SRV) record associated with the established predefined domain is configured to define the identity of a member of the established predefined domain and is configured to point to said member's Fully qualified Domain Name of the operator network's entry point from the IMS interconnect DNS.

10. The method according to claim 9, wherein the step of providing an administering support further comprises the step of checking that the first user is authorized for administering the established predefined domain.

11. The method according to claim 9, wherein the step of providing an administering support comprises the step of checking that the established predefined domain name based IMPU is unique on the established predefined domain and on the Internet and that the first user requesting the established predefined domain also is responsible for the domain on the Internet having the same identity as the established predefined domain.

12. The method according to claim 9, wherein the step of establishing the identity associated with established predefined domain as a Private domain name based IMPU associated to the IMS identity of the user to be connected in the IMS interconnect network is managed by a second user of a second operator, wherein the second user of the second operator is the user to be connected as a member of the established predefined domain.

13. The method according to claim 9, wherein the step of establishing the identity associated with the established predefined domain as a Private domain name based IMPU associated to the IMS identity of the user to be connected in the IMS interconnect network is managed by a third user of the first operator.

14. The method according to claim 9, wherein the step of establishing the identity associated with established predefined domain as a Private domain name based IMPU further comprises the step of configuring the IMS interconnect network such that the identity associated with the established predefined domain is a valid Private domain name based IMPU associated to the user's IMS identity in the Home Subscriber Server (HSS) of the operator network which the user is connected to.

15. The method according to claim 9, wherein the established predefined domain is an enterprise domain.

16. The Method according to claim 15, wherein the DNS system of the operator network comprises internal DNS of the enterprise network, whereby the external DNS of the operator network is adapted to point to the internal DNS of the enterprise network, and the step of inserting members of the established predefined domain comprises the further step of inserting the members in the internal DNS of the enterprise domain.

* * * * *